United States Patent [19]

Toerner et al.

[11] 4,449,742

[45] May 22, 1984

[54] FLEXIBLE SLEEVE TYPE CONNECTING STRUCTURE

[75] Inventors: Ludger Toerner, Eppertshausen; Dieter Garvens, Pfungstadt; Günter Hager, Untersteinach; Anton Rettinger, Frankfurt, all of Fed. Rep. of Germany

[73] Assignee: Carl Schenck AG, Darmstadt, Fed. Rep. of Germany

[21] Appl. No.: 373,219

[22] Filed: Apr. 29, 1982

[51] Int. Cl.³ .................. F16L 21/00; F16L 11/00
[52] U.S. Cl. .................. 285/236; 138/109; 138/110; 138/124; 138/125; 428/36
[58] Field of Search ............. 138/109, 110, 120, 124, 138/125, 126; 285/226, 229, 235, 236; 428/36

[56] References Cited

U.S. PATENT DOCUMENTS

| | | | |
|---|---|---|---|
| 3,633,946 | 1/1972 | Kazmierski, Jr. | 282/229 |
| 4,106,798 | 8/1978 | Haug | 285/226 |
| 4,186,949 | 2/1980 | Bartha et al. | 285/229 |
| 4,241,944 | 12/1980 | Clark | 285/229 |
| 4,323,089 | 4/1982 | Kadono et al. | 138/109 |

*Primary Examiner*—William R. Dixon, Jr.
*Attorney, Agent, or Firm*—W. G. Fasse; D. H. Kane, Jr.

[57] ABSTRACT

A flexible sleeve type connecting structure, especially for connecting an inlet and/or outlet of a movably supported weigh hopper to other stationary scale components, includes a sleeve (1) made of a flexible webbing. The outer surface of the webbing sleeve (1) is provided with a silicone coating. The inner surface of the webbing coating has bonded thereto a layer or film of silicone by a suitable adhesive. The strands in the webbing extend at about 45° relative to the longitudinal axis of the sleeve for an improved flexibility. Each end of the sleeve has a flange (2, 2') extending radially outwardly and merging into a bulging ring (3, 3') at the radially outer edge of the respective flange. The webbing forms an integral part of the sleeve, of the flanges and of the bulging rings which are received in grooves of respective mounting member (10, 10').

12 Claims, 3 Drawing Figures

FLEXIBLE SLEEVE TYPE CONNECTING STRUCTURE

CROSS-REFERENCE TO RELATED APPLICATION

The present application is based on German Patent Application No. P 30 41 872.5, filed in the Federal Republic of Germany on Nov. 6, 1980.

BACKGROUND OF THE INVENTION

The invention relates to a flexible sleeve type connecting structure especially for connecting a weigh hopper which is movable, to stationary structural components. Connecting devices of this type must satisfy a plurality of requirements, for example, they must be flexible and remain fully operable over a wide temperature range. Additionally, such connecting devices must be capable of taking up pressure shocks that may occur under the operating conditions to which such connecting devices are exposed. The present connecting device is especially suitable to connect the inlet and the outlet of a weigh hopper to respective stationary structural components.

It is known to make the flexible sleeve type portion of such connecting devices of a webbing material having a high tearing resistance, whereby the webbing is coated on both sides by a suitable coating material.

In connection with bulk scales which are used, for example, in coal dust processing plants or plants for handling other dusts capable of exploding, it is necessary to satisfy certain safety requirements. Thus, the flexible connections to the weigh hopper inlet and to the weigh hopper outlet must be capable of taking up explosion pressure shock loads, for example, up to a maximum of ten bar gauge pressure which may occur when a batch of coal dust explodes. In addition, the flexible sleeve type connections must be capable of avoiding the introduction of loads into the scale which would falsify the weight ascertained by the scale. In other words, the shunting of undesired loads or forces into the scale must be avoided by these flexible sleeve type connections in order to satisfy the technical weighing conditions and to assure precise weighing results. The requirements must be met regardless of the type of undesirable loads that must be kept from affecting the weighing result.

Scales, especially continuous feeding scales and batch weighing scales are conventionally installed in structures including large volume supply containers. Different loads applied to these structures may result in bowing or sagging of elements of the structure. Such bowing or sagging may result in permanent deformations of the structure. However, the just described phenomena must not result in the introduction of load components into the scale which would falsify the weighing result. Therefore, the flexible connections disclosed herein must avoid such transmission of undesired force components into the respective scale.

Additionally, the flexible connecting devices must be fully operational over a temperature range extending from normal environmental temperatures to up to 200° C. for example. The flexible, heat resistant, connection must also be gas and liquid tight.

Different versions of such flexible connecting devices are known in the art, for example, folding flexible sleeve type systems made of metal and rubber as well as fabric sleeves and membranes have been used for these purposes. A known flexible sleeve type arrangement comprises, for example, a webbing which is coated on both sides and has a high tearing resistance. Such a webbing is provided with cylindrical end portions, or rather connecting members. However, the actual connection of such a flexible sleeve is rather involved and hence expensive. Besides, such a structure is not suitable for taking up pressures because the connecting points of the flexible sleeve become loose and start to leak. Further, all prior art flexible connecting devices do not satisfy the requirements that must be met by connecting devices for weigh hoppers employed for handling, for example pulverized coal, whereby these connecting devices must take up pressures of up to ten bar and must be heat resistant at temperatures to about 200° C.

OBJECTS OF THE INVENTION

In view of the foregoing it is the aim of the invention to achieve the following objects singly or in combination:

to provide a flexible sleeve type connecting device for a weigh hopper which device meets all of the above mentioned requirements and which nevertheless may be manufactured at reasonable expense;

to improve the flexibility of the flexible sleeve while simultaneously protecting the flexible sleeve against excessive loads;

to construct the flexible sleeve so that a uniform tension load distribution is assured throughout the webbing of the flexible sleeve; and to provide a simple, yet effectively sealing connection between the flexible sleeve proper and other structural components.

SUMMARY OF THE INVENTION

According to the invention there is provided a flexible sleeve type connecting arrangement for a weigh hopper. The flexible sleeve type arrangement or device is constructed to withstand pressure shocks and remain operable in a wide temperature range. The flexible sleeve type device is provided with connecting elements for connecting the inlet and outlet of the weigh hopper which is movable, with stationary structural components. The bellows or sleeve proper is made of a webbing highly resistant to tearing and covered on both sides with a coating. More specifically, the inner surface of the webbing has secured thereto a silicone film by an adhesive bond. The outer surface of the webbing is coated with a silicone coat. The threads of the webbing extend diagonally so that these threads form an angle of substantially 45° with the longitudinal central axis of the connecting device. The sleeve portion of the flexible sleeve is provided at each end with a flange type connecting member which in turn is provided at its circumference with a bulging reinforcing ring. The webbing, which is highly tear resistant, merges integrally from the cylindrical sleeve portion into the flange type connecting portions.

It has been found that due to the combination of the threads extending at 45° to the longitudinal axis of the connecting device and due to the inner silicone layer in combination with the outer thinner silicone coating the flexible sleeve according to the invention is highly flexible, especially in the axial direction.

Tests have shown that under normal operating conditions the shunting forces were only, for example, 100 grams per millimeter for an excursion of 10 mm without loading the connecting device with an explosion pressure. The same arrangement remained fully operable after an explosion test in which the explosion shock pressure was at least ten bars gauge. Additionally, the tested device remained gas tight under gauge pressures up to at least ten bar. The device remained operational under temperature conditions exceeding 200° C.

It is believed that the high flexibility combined with the high strength of the present device is accomplished primarily by the diagonal arrangement of the threads in the highly tear resistant webbing. This feature apparently also assures a uniform tension load distribution throughout the webbing. Additionally, the diagonal arrangement of the threads in the webbing facilitates the formation of the flange type connecting members at each end of the sleeve portion of the webbing. The connecting flanges on the other hand permit or assure a simple securing of the flexible sleeve to the connecting rings and connecting elements. These flanges with their bulging ring portions further assure a secure, gas tight sealing of the flexible sleeve relative to its connecting members. The silicone layer or film on the inside of the webbing in combination with the silicone coating on the outside of the webbing makes the entire structure gas tight and protects the webbing against external damages. Additionally, the high temperature performance is assured by the silicone film and silicone coating.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
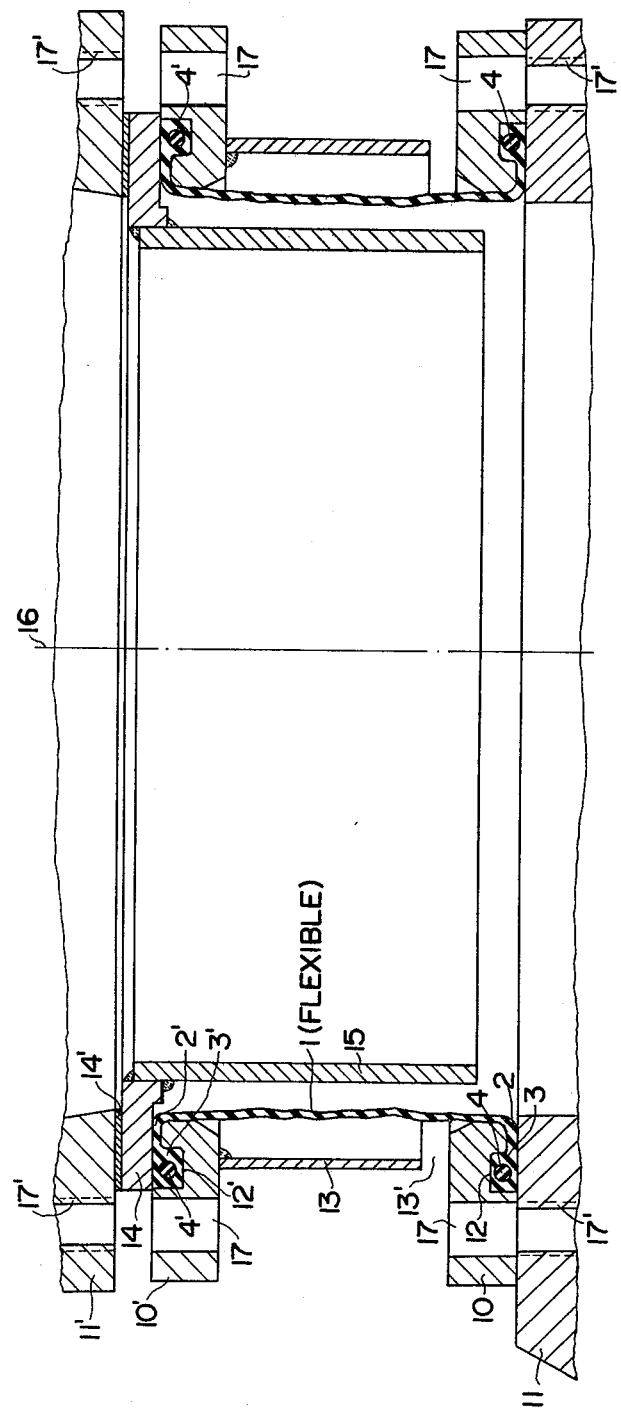
FIG. 1 shows a sectional view through a flexible sleeve type connecting device according to the invention including the flange type connecting ring members.

FIG. 1 shows that the flexible sleeve portion 1 of the bellows is provided at each end with a connecting flange portion 2, 2' extending radially relative to the longitudinal axis 16 of the device. Each flange portion 2, 2' extends into a bulging ring portion 3, 3' acting as a reinforcement of the flange portion. Each ring portion 3, 3' has embedded therein a silicone string or thread 4, 4'.

The connecting sleeve or bellows 1 with its flanges 2, 2' and bulging ring portions 3, 3' is connected by suitable means to connecting ring members 10, 10'. For this purpose each ring member is provided with a ring groove 12, 12' in which the bulging ring portion 3, 3' is received, preferably with a pressfit. Thus, the flange portions 2, 2' serve simultaneously as sealing means between the components to be connected, for example, between the inlet flange 11 of a weigh hopper not shown and the connecting ring member 10. The ring 10 is provided with a through hole 17 and the inlet flange 11 is provided with a threaded hole 17', whereby the ring 10 may be secured to the inlet flange 11 by screws not shown. The same sealing function is accomplished by the flange portion 2' between the ring member 10' and a washer type holding member 14 to be described in more detail below. Thus, separate sealing means have been obviated, except for a sealing gasket 14' located between the holding washer 14 and a port flange 11' forming part of a stationary component not shown in detail. The connecting ring 10' is also secured to the port flange 11' by a screw extending through holes 17, 17'.

Incidentally, the ring members 10, 10' need not be constructed as continuous rings. Rather, it is possible to use ring segments if that should be more convenient.

A substantially rigid protecting jacket 13 in the form of a cylindrical pipe section is secured to one of the rings 10, or 10' to surround the sleeve portion 1 in a protecting manner. The jacket 13 may, for example, be welded to the respective ring 10'. The flexible sleeve portion 1 may rest against the protective jacket 13, for example, when the sleeve portion 1 is exposed to a high pressure load or pressure shock load. Thus, an excessive loading of the sleeve portion, especially in the tangential direction or damage to the connecting sleeve or bellows 1 is avoided when such excessive loading occurs. The lower free end of the jacket 13 is spaced from the lower ring 10 to form an axial gap 13', whereby the axial flexibility of the sleeve 1 is maintained.

A further protection jacket 15 also made, for example of steel, is secured to the holding washer 14 which in turn is clamped between the ring 10' and the port flange 11'. As mentioned, a sealing gasket 14' is preferably inserted between the holding washer 14 and the port flange 11'. The further protecting jacket 15 has a sufficient axial length to protect the sleeve or bellows portion 1 against direct contact by the material which is moving or sliding through the bellows type connecting device. Thus, the sleeve 1 is protected against direct damage by such material which may be quite abrasive. If desired, the holding washer 14 and the sealing gasket 14' may be omitted by connecting the inner protecting jacket 15 directly to the port flange 11'.

In the example embodiment illustrated in FIG. 1 the inlet flange 11 is connected to the inlet port of a movable weigh hopper, whereas the port flange 11' is part of a stationary supply container of the scale system. However, the same structure may also be used between the outlet port of the weigh hopper and a receiving container not shown.

The described flexible sleeve type connecting device according to the invention does not interfere at all with the movements of the weigh hopper and elastical deformations of the connecting structure are taken up by the flexible sleeves so that disturbing influences are substantially prevented from affecting the operation of the scale. As mentioned, the disclosed device has shown under test conditions simulating operating conditions that the flexible sleeve type connection can take up the pressure or tension loads to which the flexible connection may be exposed in case of an explosion of the material flowing through the connecting device.

Figure 2:
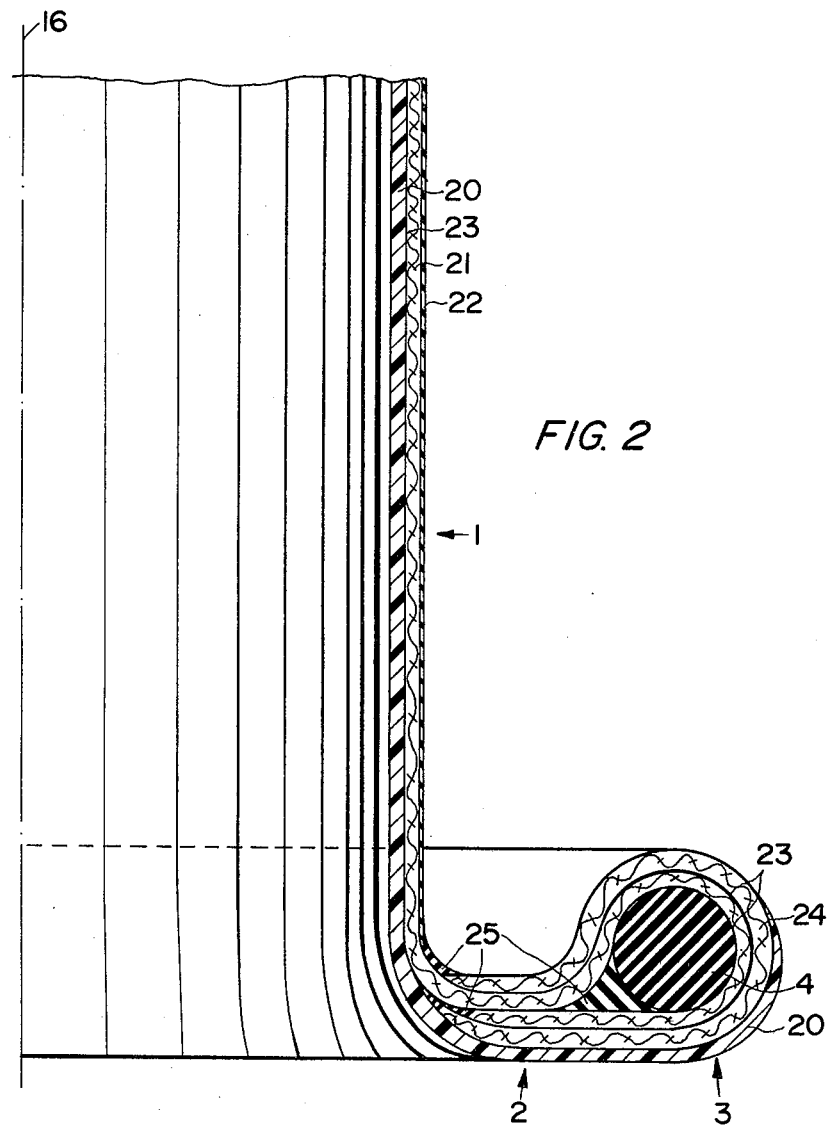
FIG. 2 shows on an enlarged scale the formation of the sleeve portion, the flange portion, and the bulging ring portion of the flexible sleeve according to the invention.

FIG. 2 shows on an enlarged scale the construction details of a connecting flexible sleeve according to the invention especially suitable for connection to a weigh hopper. The inner surface of the hose type sleeve is covered by a film or layer 20 of silicone bonded to the fabric layer or webbing 21 by means of a silicone adhesive bond 23. The webbing 21 is made of a highly tear resistant material such as a fabric of "KEVLAR" fibers (RTM), the outer surface of which is covered by a silicone coating 22. The webbing 21 is also highly heat resistant, under temperature conditions up to 200° C.

Figure 3:
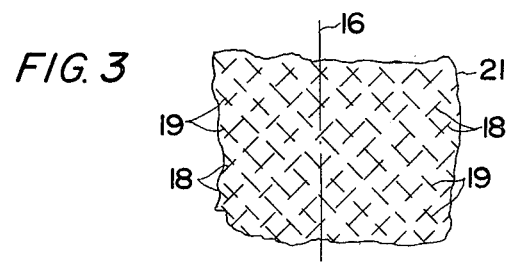
FIG. 3 illustrates the arrangement of the threads in the webbing at a 45° angle relative to the longitudinal axis of the device.

FIG. 3 shows how the individual threads 18 and 19 of the webbing 21 extend at right angles relative to one another and at an angle of about 45° relative to the longitudinal axis 16 of the flexible sleeve. By arranging the warp and woof threads in the manner illustrated, a high flexibility is achieved during normal operation of the connecting device as well as a high load resistance during pressure load shocks. This feature has the further advantage that the webbing 21 may directly be extended to merge integrally into the flange portion 2 and into the bulging ring portion 3 as shown in FIG. 2.

The webbing end portions are looped around a silicone string or thread 4 to form the bulging ring 3 which is further reinforced together with the flange portion 2 by an insert 24 also adhesively bonded to the webbing 21 and to the string or thread 4 by a silicone adhesive. Silicone or rubber type filler material is provided at the locations 25 as shown in FIG. 2. The thicker inner silicone layer 20 is extended until it merges into the outer silicone coating 22. All adhesive bonding is accomplished by a silicone type adhesive such as FD-plast 1 P 975 produced by CompahtaWerke GmbH.

Although the invention has been described with reference to specific example embodiments, it will be appreciated, that it is intended to cover all modifications and equivalents within the scope of the appended claims.

What is claimed is:

1. A flexible sleeve type connecting and sealing device having a longitudinal central axis for enclosing in a sealing manner a passage between a movable member and a stationary member, comprising a first flexible bellows type sleeve portion, a second flange portion extending substantially radially outwardly from each end of said first portion, and a third bulging ring portion near the circumference of each of said flange portions, said first, second and third portions being made of a three layer material including a webbing which has a high tear resistance and which is sandwiched between an inner silicone layer adhesively bonded by a silicone type adhesive bond to said webbing and an outer silicone coating on said webbing also adhesively bonded to said webbing by a silicone type adhesive bond, said three layer material merging integrally from said first cylindrical portion into said second flange portions, said webbing having threads extending at an angle of about 45° relative to said longitudinal central axis in said first portion for an improved flexibility, especially in the axial direction, said sandwiched three layer material having a high heat resistance and a high resistance to rupture as a result of sudden pressure increases inside the sealing device.

2. The flexible sleeve type connecting device of claim 1, wherein said inner silicone layer is thicker than said outer silicone coating for facilitating the merging of said silicone layer and silicone coating into said flange portions.

3. The flexible sleeve type connecting device of claim 1, wherein said third bulging ring portions comprise a string of silicone embedded in said webbing of said three layer material.

4. The flexible sleeve type connecting device of claim 3, further comprising webbing material inserts enveloping said bulging ring portions and extending radially for reinforcing the respective flange portion.

5. A flexible sleeve type connecting and sealing device having a longitudinal central axis for enclosing in a sealing manner a passage between a movable member and a stationary member, comprising a first flexible bellows type sleeve portion, a second flange portion extending substantially radially outwardly from each end of said first portion, and a third bulging ring portion near the circumference of each of said flange portions, said third bulging ring portion comprising a silicone string, said first, second and third portions being made of a three layer material including a webbing having a high tear resistance and sandwiched between an inner silicone layer adhesively bonded by a silicone type adhesive bond to said webbing and an outer silicone coating on said webbing also adhesively bonded to said webbing by a silicone type adhesive bond, said three layer material merging integrally from said first cylindrical portion into said second flange portions, said sandwiched three layer material looping around said silicone string thereby forming said bulging ring portion with the silicone string embedded in said three layer material, said webbing having threads extending at an angle of about 45° relative to said longitudinal central axis in said first portion for an improved flexibility especially in the axial direction, and first and second connecting rings, a ring groove in each connecting ring, said ring grooves facing each other axially, said bulging ring portions being received in the respective ring groove, preferably with a press fit, said sandwiched three layer material having a high heat resistance relative to temperatures up to about 200° C., said sandwiched three layer material having a high resistance to rupture as a result of sudden pressure increases up to about at least 10 bar gage pressure inside said sealing device.

6. The flexible sleeve type connecting device of claim 2, further comprising a substantially rigid projecting jacket rigidly secured to one of said connecting rings and extending substantially coaxially and outwardly of said sleeve portion toward the respective other connecting ring for protecting the sleeve portion, said protecting jacket having a free end axially spaced by a gap from the other connecting ring for permitting an axially flexing movement of said sleeve portion.

7. The flexible sleeve type connecting device of claim 6, comprising a further substantially rigid protecting jacket, and means operatively supporting said further protecting jacket substantially coaxially inside said sleeve portion.

8. The flexible sleeve type connecting device of claim 7, wherein said further protecting jacket has an axial length larger than the axial spacing between said connecting rings.

9. The flexible sleeve type connecting device of claim 7, wherein said supporting means for said further protecting jacket comprise a washer to which the further protecting jacket is secured so that the washer extends radially away from said further protecting jacket.

10. The flexible sleeve type connecting device of claim 2, wherein said connecting rings comprise means for securing these rings to structural components.

11. The flexible sleeve type connecting device of claim 2, wherein said inner silicone layer is thicker than said outer silicone coating for facilitating the merging of said silicone layer and silicone coating into said flange portions.

12. The use of a flexible sleeve type connecting and sealing device having a longitudinal central axis com-